Aug. 2, 1960

J. F. HAYDEN ET AL 2,947,218

DOCUMENT HANDLING APPARATUS

Filed Dec. 15, 1955

JAMES F. HAYDEN
GLEN W. OFFENSEND
INVENTORS

BY *Daniel I. Magee,*

*Paul R. Holmes*

ATTORNEYS

Aug. 2, 1960  J. F. HAYDEN ET AL  2,947,218
DOCUMENT HANDLING APPARATUS
Filed Dec. 15, 1955  2 Sheets-Sheet 2
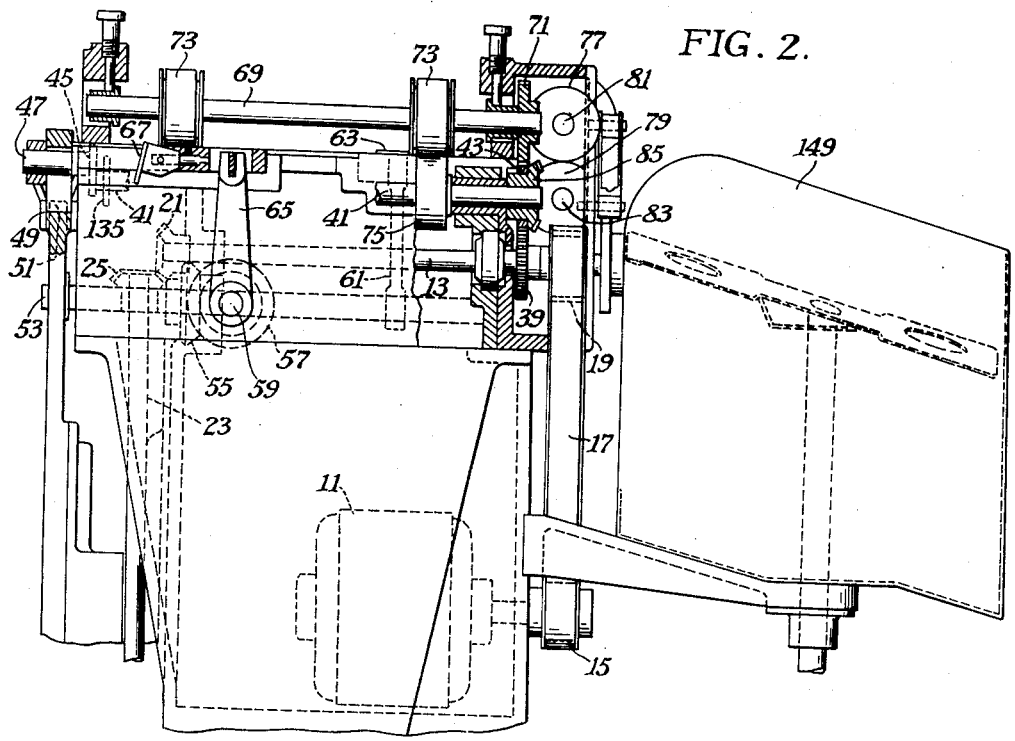
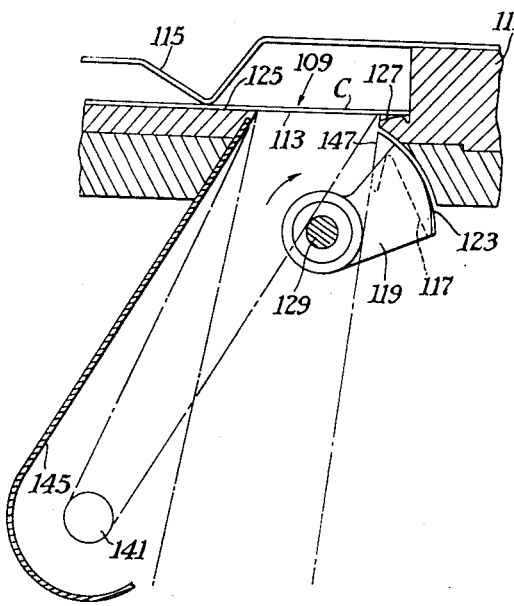
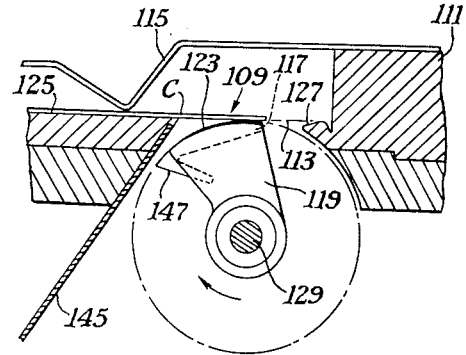
JAMES F. HAYDEN
GLEN W. OFFENSEND
INVENTORS
BY Daniel I. Mayne
Paul R. Holmes
ATTORNEYS

United States Patent Office 2,947,218
Patented Aug. 2, 1960

2,947,218

DOCUMENT HANDLING APPARATUS

James F. Hayden and Glen W. Offensend, Rochester, N.Y., assignors to Eastman Kodak Company, Rochester, N.Y., a corporation of New Jersey Filed Dec. 15, 1955, Ser. No. 553,314

2 Claims. (Cl. 88—24)

This invention relates to document handling apparatus and more particularly to a device for engaging the surface of a moving document to support the leading edge thereof during movement of the edge across an aperture in a document handling apparatus.

In photocomposing apparatus of the type disclosed in U.S. application Serial No. 326,938 entitled, "Strip Material Advancing Mechanism," filed December 19, 1952, issued as Patent No. 2,738,704 on March 20, 1956, and of which we are two co-inventors, a single line of printed matter which is contained in discrete areas of previously prepared cards, is automatically photographed as the cards are rapidly advanced through the photographing station of the machine. Because only one line of printed matter on the card is photographed, the aperture in the photographing station is relatively narrow and represents a relatively small percentage of the total area of the card.

Relatively recent improvements in this type of photocomposing apparatus permit the photographing of as much as three lines of printed matter on the discrete area of the cards and in some instances the printed line extends the full length of the card. Necessarily in order to photograph this large an area of the card, the aperture of the photographing station must also be correspondingly enlarged from the size formerly required. With the increased area of the aperture in the photographing station, the cards have a tendency to jam at some point against an edge of the aperture and to skew with respect to the photographing station, or in some instances, due to curl in the card, to fall partly into the aperture of the photographing station. In either event, the printed matter is misaligned with respect to the photographing station resulting in improper photographing thereof and in some cases the complete jamming of the photocomposing apparatus.

Our invention avoids misalignments of the cards in the photographing station and also permits an increased amount of light to be directed to the photographing station, which results in an aligned image of the printed matter on the previously prepared card to be recorded with high contrast on the film strip in the exposure station. According to the invention, we provide a card support mounted for rotation into the aperture of the photographing station in timed relation to the advance of cards into the photographing station, for engaging the surface of each card and to support the leading edge thereof during movement of the edge across the aperture. After the card has been fully advanced into the photographing station, the card support is rotated out of the optical path between the photographing station and the exposure station, a lamp is flashed to illuminate the photographing station, and an image of the printed matter on the area of the card positioned over the aperture of the photographing station, is recorded on the film strip in the exposure station. A reflecting surface is provided on the card support for directing the light which strikes the reflecting surface to the photographing station and thereby intensifying the light at the aperture of the photographing station. Although the described photocomposing apparatus utilizes cards that are available commercially, such as IBM cards, it is to be understood that various other types of cards, or discrete sheets may be used and that the term "document" as used in the specification and claims is intended to designate any single sheet.

The primary object of the present invention is, therefore, to provide a device operating in synchronism with the advance of documents to an aperture, for engaging the surface of each document to support the leading edge thereof during movement of the edge across the aperture.

Another object of the present invention is to provide a device for engaging the surface of a document to support the leading edge thereof during movement of the edge across the aperture in the photographing station of a photographic apparatus.

Yet another object of the present invention is to provide in a photographic apparatus, a document support mounted for rotation into the aperture of the photographing station in timed relation to the advance of individual documents into the photographing station, for engaging the surface of each document and to support the leading edge thereof during movement of the edge across the aperture, and which at the time of photographing the document, is rotated out of the aperture of the photographing station.

Still another object of the present invention is to provide a device for engaging the surface of a document for supporting the leading edge thereof during movement of the edge across the aperture of the photographing station in the photographic apparatus, said device having a reflecting surface for directing light from a lamp to the document in the photographing station in order to intensify the illumination at the photographing station.

Other objects and advantages of the present invention will become readily apparent to those skilled in the art from the following description with reference to the drawings in which like characters denote like parts and wherein:

Fig. 2 is a side elevation view of the photocomposing apparatus taken along line 2—2 of Fig. 1;

Fig. 3 and Fig. 4 are enlarged detailed views of the photographing station of the photocomposing apparatus of Fig. 1 and illustrating our invention;

Figure 1:
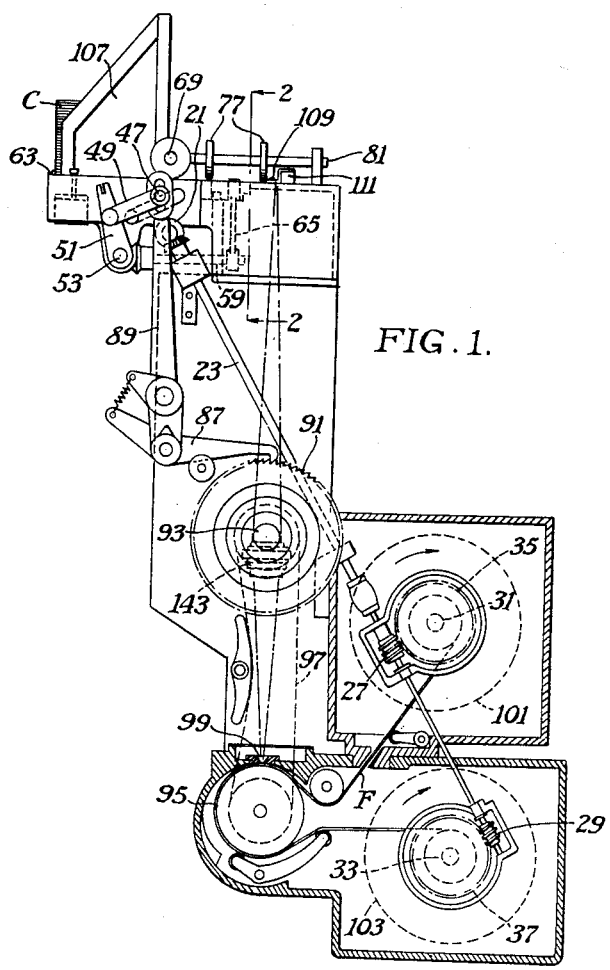
Fig. 1 is an elevation view of a photocomposing apparatus utilizing our invention.
Figure 6:
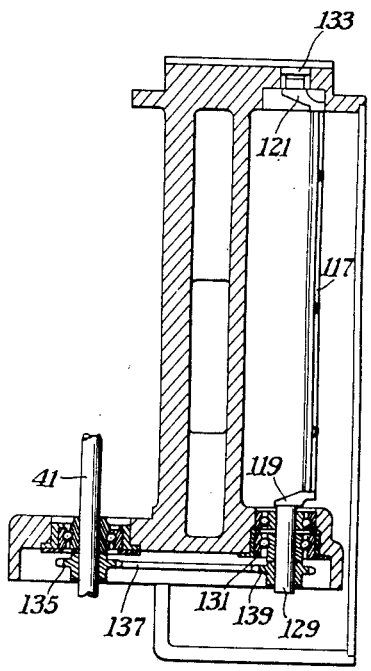
Figure 5:
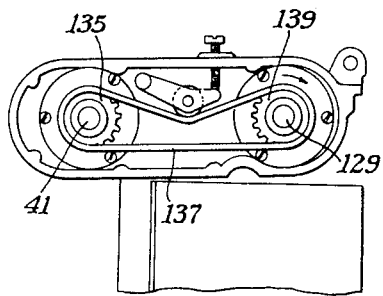
Figure 7:
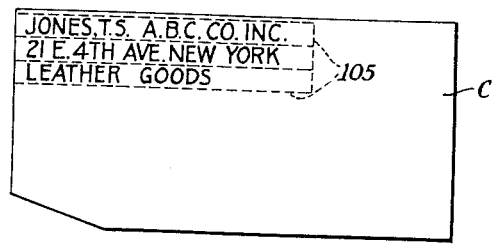

Figs. 5 and 6 are views illustrating the mounting of and driving connections for the card support shown in Figs. 3 and 4; and Fig. 7 illustrates a card utilized by the photocomposing apparatus of Figs. 1 and 2.

In Figs. 1 and 2, we have shown a photocomposing apparatus which is a modificaion of the type disclosed in the above-mentioned U.S. application Serial No. 326,938. The operation is exactly the same, however, except as to the incorporation of our invention as will be hereinafter described. Motor 11 drives shaft 13 through sprocket 15, chain 17 and sprocket 19. A spiral miter gear 21 on the remote end of shaft 13 drives shaft 23 through spiral miter gear 25. Worms 27 and 29 are secured to shaft 23 and rotate supply spindle 31 and take-up spindle 33, respectively, through worm gears 35 and 37, respectively, and tendency drives (not shown), in the manner well known in the art.

Gear 39 on shaft 13 drives shaft 41 through gear 43. The remote end of shaft 41 is provided with a collar 45 in which eccentric stud 47 is mounted. Stud 47 is connected by link 49 to the arm 51 which is secured to shaft 53 on which bevel gear 55 is mounted. Thus, rotation of shaft 41 causes shaft 53 to be oscillated by arm 51 through the motion of link 49, and this oscillation is transmitted from bevel gear 55 to bevel gear 57 and shaft 59. Arm 61 which is mounted on shaft 53, actuates a picker 63, and arm 65 which is mounted on shaft 59, actuates a picker 67. Thus the pickers 63 and 67 operate in synchronism with each other from the oscillations transmitted to shaft 53.

Gear 43 on shaft 41 drives shaft 69 through gear 71. Feed rolls 73 and 75 are mounted on and driven by shaft 69 and 41 respectively. Feed rolls 77 and 79 mounted on shafts 81 and 83, respectively, are driven from bevel gear 85 on shaft 41 through a bevel gear (not shown), mounted on shaft 83.

The film strip advancing mechanism which is the subject of the above noted application Serial No. 326,938 is described in detail in that application, and since it does not constitute a part of the present invention, will not be repeated here. Suffice it to say, however, that pawls 87, only one of which is shown, which are carried by the lower end of oscillating arm 89, engage and actuate ratchets 91, only one of which is shown, which are mounted on shaft 93. Shaft 93 in turn drives the film drive roll 95 by means of a chain belt 97 to advance the film strip F through the exposure station 99 from supply reel 101 to take-up reel 103. Thus the film strip F is advanced in synchronism with the movement of pickers 63 and 67.

Fig. 7 illustrates one of the cards C which is utilized in the photocomposing apparatus. One or more lines of printed matter is contained within the area 105 on each card C. It is to be understood that the length and/or width of the area 105 can be varied as desired within the limits defined by the edge of the card C and that the illustration is merely by way of example. The cards C are stacked in the hopper 107 with the area 105 to be photographed, facing downward. The operation of the apparatus begins with picker 63 moving the bottom card C from the hopper 107 into the bite of feed rolls 73 and 75, which move the card C into the photographing station 109 against the edge of locating bar 111, which is positioned adjacent the elongate rectangular aperture 113. This structure will be more easily understood by reference to Figs. 3 and 4 which are enlarged detailed views of the photographing station 109. The card C is moved under and held in position by leaf spring 115 while in the photographing station 109, and area 105 is then aligned with aperture 113. A card support comprising a support plate 117 and side brackets 119 and 121, is mounted for rotation under aperture 113 in a manner such that the upper surface 123 of plate 117 is rotatable into the plane formed by the surfaces 125 and 127 adjacent aperture 113. Bracket 119 is provided with a short shaft 129 which is mounted in suitable bearings 131 in the frame of the photographic apparatus. A stud 133 is provided on bracket 121 in axial alignment with shaft 129 and mounted in the frame of the photographic apparatus opposite the mounting of shaft 129. This structure is readily apparent in the illustration of Figs. 5 and 6. A sprocket 135 is mounted on shaft 41, as best illustrated in Figs. 2 and 6, and drives the card support through a chain belt 137 and sprocket 139 mounted on shaft 129. The rotation of the card support is thus synchronized with respect to the advance of cards C into the photographing station 109 by picker 63 and feed rolls 73 and 75 so that the upper surface 123 of the card support, supports the leading edge of the card C across the aperture 113 and onto the surface 127 adjacent the aperture 113.

Mounted parallel to and at a short distance beneath the aperture 113, is a tubular type mercury vapor flash lamp 141 from which light is directed to the card C in the photographing station 109. When card C is aligned in the photographing station 109 adjacent locating bar 111, the card support rotates to a position out of the path of the optical system between the photographing station 109 and the exposure station 99. This position of the card support is illustrated in Fig. 3 of the drawing. At the instant the card support reaches the position illustrated in Fig. 3, the flash lamp 141 is energized to illuminate the photographing station 109 and an image of the printed matter contained in the area A of the card C then in the photographing station, is transmitted by the lenses 143 of the optical system to the film strip F in the exposure station 99. The light from lamp 141 directed to the photographing station 109 is reinforced by reflector 145. In order to further increase the amount of light reaching photographing station 109, the card support is provided with a light reflecting surface 147. This surface 147 when in the position illustrated in Fig. 3, directs light striking the surface 147 which has been reflected by the reflector 145 or which comes directly from the lamp 141, to the card C in the photographing station 109. The energization of flash lamp 141 and the rotation of the card support is thus synchronized with the advance of cards C into the photographing station 109.

After the image has been recorded on the film strip F in the exposure station 99, picker 67 moves the card C from the photographing station 109 into the bite of feed rolls 77 and 79 which expel the card into the receptacle 149, the picker 63 moves a new card C from the hopper 107 into the bite of feed rolls 73 and 75, and film strip F is advanced a distance sufficient to permit the recording of an image in nonoverlapping relation to the previous image recorded thereon.

From the foregoing description it is evident that the card support of our invention is operable in synchronism with the advance of individual cards to an aperture, for engaging the surface of each card to support the leading edge thereof during movement of the edge across the aperture. Further, as utilized in the photographic apparatus herein disclosed, the card support of our invention is mounted for rotation into the aperture of the photographic station in timed relation to the advance of cards into the photographing station, to engage the surface of each card and to thereby support the leading edge of the card across the aperture and onto the surface adjacent the aperture, and which at the time of exposure of the card in the photographing station, is rotated out of the path of the optical system between the photographing station and the exposure station to a position where the light from the flash lamp which strikes a light reflecting surface thereof, is directed to the aperture of the photographing station.

While only one embodiment of the invention has been described, other modifications are possible and will be readily apparent to those skilled in the art from the foregoing description, and therefore, the disclosure is intended to be only illustrative and the scope of the invention is defined in the appended claims.

Having now particularly described our invention what we desire to secure by Letters Patent of the United States and what we claim is:

1. Document handling and illumination intensifying apparatus for a device having a work surface provided with an aperture, means for moving documents successively on said work surface and over said aperture, and means for illuminating said aperture, said apparatus comprising a member having a document supporting surface and a light reflecting surface and rotatably mounted about an axis which is parallel to and spaced below the plane of said work surface and is normal to the direction of movement of said documents over said aperture, said member being rotatable about said axis for movement to a first position at which said document supporting surface is in said aperture in supporting relation to the underside of each of said documents moving over said aperture and to a second position in which said reflecting surface reflects light from said illuminating means to said aperture to intensify the illumination of each of said documents positioned over said aperture, said positions of said member being angularly spaced about said axis whereby said document supporting surface is out of said aperture and in noninterfering relation to light reflected to said aperture by said reflecting surface in said second position, and means for rotating said member about said axis through said first position in the direction of and in synchronism with the movement of the leading edge of said documents over said aperture and through said second position while said documents are over said aperture.

2. A document handling and illumination intensifying device for a photographic apparatus having a photographing station provided with an aperture, means for advancing documents successively into said photographing station and over said aperture and means for illuminating each of said documents in said photographing station, said device comprising a document supporting surface mounted for rotation about an axis which is parallel to and spaced below said photographing station and which is normal to the direction of movement of said documents over said aperture, said document supporting surface having a first position in said aperture in supporting relation to the underside of each of said documents moving over said aperture, means for rotating said document supporting surface about said axis through said first position in the direction of and in synchronism with the movement of said documents over said aperture whereby said document supporting surface moves into said first position simultaneously with the movement of the leading edge of each of said documents over said aperture, and a light reflecting surface having a longitudinal edge common with a longitudinal edge of said document supporting surface and mounted in fixed relation to said document supporting surface between said document supporting surface and said axis for rotation therewith as a unit about said axis, said reflecting surface having a reflecting position while each of said documents is over said aperture and at which the spatial relation of said reflecting surface to said illuminating means and said aperture is such that light from said illuminating means is directed by said reflecting surface to said document over said aperture to intensify the illumination thereof, said first position of said document supporting surface and said reflecting position of said reflecting surface being angularly spaced about said axis to position said document supporting surface out of said aperture and in noninterfering relation to light reflected to said aperture by said reflecting surface in said second position.

References Cited in the file of this patent

UNITED STATES PATENTS

| | | |
|---|---|---|
| 1,754,057 | Sherman et al. | Apr. 8, 1930 |
| 2,153,154 | Nivison | Apr. 4, 1939 |
| 2,235,844 | Nelson | Mar. 25, 1941 |
| 2,292,825 | Dilks | Aug. 11, 1942 |
| 2,719,714 | Pratt | Oct. 4, 1955 |
| 2,787,214 | Halahan et al. | Apr. 2, 1957 |
| 2,793,855 | Becker | May 28, 1957 |